US011767939B2

(12) United States Patent
Larson

(10) Patent No.: US 11,767,939 B2
(45) Date of Patent: Sep. 26, 2023

(54) GRIP RING

(71) Applicant: Mueller International, LLC, Atlanta, GA (US)

(72) Inventor: Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 174 days.

(21) Appl. No.: 17/210,028

(22) Filed: Mar. 23, 2021

(65) Prior Publication Data

US 2022/0307631 A1  Sep. 29, 2022

(51) Int. Cl.
*F16L 19/10* (2006.01)
*F16L 19/065* (2006.01)

(52) U.S. Cl.
CPC ............. *F16L 19/10* (2013.01); *F16L 19/065* (2013.01)

(58) Field of Classification Search
CPC ....... F16L 19/08; F16L 19/083; F16L 19/086; F16L 19/10; F16L 19/12; F16L 37/091; F16L 37/092; F16L 37/0925
USPC ................................ 285/248–249, 340, 354
See application file for complete search history.

(56) References Cited

U.S. PATENT DOCUMENTS

| | | | |
|---|---|---|---|
| 2,201,372 A | | 5/1940 | Miller |
| 2,355,871 A | * | 8/1944 | Kraft ....................... F16L 19/12 29/520 |
| 2,786,697 A | | 3/1957 | Rescheneder |
| 3,290,069 A | * | 12/1966 | Davis ....................... F16L 19/10 285/341 |
| 3,471,181 A | * | 10/1969 | Fuentes .................... F16L 19/10 285/341 |
| 3,552,781 A | * | 1/1971 | Helland ................ F16L 19/086 285/356 |

(Continued)

FOREIGN PATENT DOCUMENTS

| | | | | |
|---|---|---|---|---|
| DE | 1625961 A1 | * | 8/1971 | ............. F16L 19/08 |
| DE | 4403702 A1 | * | 2/1995 | ............. F16L 19/12 |

(Continued)

OTHER PUBLICATIONS

Harco; Article entitled: "Philmac UTC How It Works", located at <http://www.harcofittings.com/Products/Philmac/UTC/utc_010.htm>, copyright 2013, accessed on Mar. 3, 2021, 1 pg.

(Continued)

*Primary Examiner* — Matthew Troutman
*Assistant Examiner* — Fannie C Kee
(74) *Attorney, Agent, or Firm* — Taylor English Duma LLP

(57) ABSTRACT

A grip ring can include a ring body defining an inner surface facing radially inward, a first tooth, and a second tooth; each of the first tooth and the second tooth extending from the inner surface of the ring body, each of the first tooth and the second tooth defining a cylindrical end surface facing radially inward, a first side surface of each of the first tooth and the second tooth extending from the end surface of the respective tooth and towards the inner surface, and a second side surface of each of the first tooth and the second tooth extending from the end surface of the respective tooth and towards the inner surface; each of the first side surface and the second side surface of the respective tooth being angled in cross section with respect to the end surface.

23 Claims, 8 Drawing Sheets

(56) References Cited

U.S. PATENT DOCUMENTS

| | | | |
|---|---|---|---|
| 5,028,078 A * | 7/1991 | Schwarz | F16L 19/10 |
| | | | 285/12 |
| 5,160,179 A | 11/1992 | Takagi | |
| 5,692,784 A | 12/1997 | Hama et al. | |
| 5,730,476 A | 3/1998 | Gouda | |
| 6,913,292 B2 | 7/2005 | Snyder, Sr. et al. | |
| 8,322,755 B2 | 12/2012 | Kluss et al. | |
| 8,528,944 B2 | 9/2013 | Lee | |
| 9,217,529 B2 | 12/2015 | Crompton et al. | |
| 9,599,266 B2 | 3/2017 | Schreckenberg et al. | |
| 9,851,028 B2 | 12/2017 | Stout et al. | |
| 9,879,810 B2 | 1/2018 | Crompton et al. | |
| 9,903,516 B2 | 2/2018 | Salehi-Bakhtiari et al. | |
| 10,323,777 B2 * | 6/2019 | Larson | F16L 19/10 |
| 2003/0197378 A1 * | 10/2003 | Allstead | F16L 19/12 |
| | | | 285/341 |
| 2005/0264005 A1 * | 12/2005 | Norman | F16L 19/10 |
| | | | 285/249 |
| 2007/0075542 A1 | 4/2007 | Glaze et al. | |
| 2018/0283586 A1 | 10/2018 | Larson et al. | |
| 2020/0056734 A1 * | 2/2020 | Holden | F16L 19/086 |

FOREIGN PATENT DOCUMENTS

| | | | | |
|---|---|---|---|---|
| DE | 29621271 U1 * | 2/1997 | | F16L 19/08 |
| DE | 202006005082 | 7/2006 | | |
| FR | 1222909 A * | 6/1960 | | F16L 19/10 |
| GB | 1570036 A * | 6/1980 | | F16L 19/10 |
| JP | 2010084880 A * | 4/2010 | | F16L 19/10 |

OTHER PUBLICATIONS

Cambridge Brass; Article entitled: "Cambridge Coupling", located at <https://www.cambridgebrass.com/uploaded_files/CambridgeCouplingBrochure2013lr.pdf>, copyright 2013, 4 pgs.
A Y Mcdonald; Catalog for McGrip—G & 3G Series, published Feb. 2, 2021, 2 pgs.
Harco; Article entitled: "Philmac 3G CTS How It Works", located at <http://www.harcofittings.com/Products/Philmac/3G/CTS/cts_020.htm>, publicly available prior to Mar. 23, 2021, 1 pg.
Mueller Co.; Brochure for Mueller 110 Compression Connections, Copyright 2016, 4 pgs.
Mueller; Drawing for 1-1/2" & 2" Gripper, publicly available prior to Mar. 23, 2020, 1 pg.
Conex Banninger; Article entitled: "The Grip Ring", located at <https://www.conexbanninger.com.au/why-conex/the-grip-ring/>, available on the Wayback Machine as early as Mar. 6, 2019, 3 pgs.
Ford; Catalog for Ford Water Meter Couplings and Accessories, publicly available prior to Mar. 23, 2021, 16 pgs.
Mueller Co., Drawing for Straight Service Fitting Low Lead Brass (110 CTS × 110 CTS), publicly available prior to Mar. 23, 2020, 1 pg.
Mueller Co.; Catalog for Service Fittings, publicly available prior to Mar. 23, 2020, 39 pgs.
Mueller Co.; Drawing for 1/8 Bend Corporation Stop Coupling LLB (Swivel CS × CTS 110), publicly available prior to Mar. 23, 2020, 1 pg.
Mueller Co.; Flyer for Mueller Grip Compression Connection, publicly available prior to Mar. 23, 2020, 1 pg.

* cited by examiner

GRIP RING

TECHNICAL FIELD

Field of Use

This disclosure relates to compression pipe fittings. More specifically, this disclosure relates to compression pipe fittings in which each can comprise a grip ring with teeth extending from an inner surface.

Related Art

Components in a fluid distribution system can be joined to each other with fasteners to facilitate any one or more of manufacturability, shipping, installation, and service of the system or just a portion thereof. Three common compression-style joint assemblies include a Mueller 1100 "quick nut" compression connection comprising a metal grip band held in place by a gasket and a surrounding nut, a pack joint connection comprising a gasket and an external metal band with a screw, and a grip nut connection comprising a gasket and a washer driven by a nut via a metal grip band housed therein. While the typical grip nut connection can hold pipes or pipe lengths in place more securely than the other common joint assemblies, the accompanying gripper or grip ring—with multiple teeth, each of which can have the appearance of threads with a typical 60-degree profile—typically drags across an outer surface of the pipe length when tightened and can, as a result, less securely hold the pipe length to a piping element of the joint assembly.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a grip ring comprising: a ring body defining an inner surface facing radially inward; a first tooth extending from the inner surface of the ring body, the first tooth defining a cylindrical end surface facing radially inward, a first side surface extending from the end surface and towards the inner surface, and a second side surface extending from the end surface and towards the inner surface; each of the first side surface and the second side surface being angled in cross section with respect to the end surface; and a second tooth extending from the inner surface of the ring body and positioned adjacent to and offset from the first tooth, the second tooth defining a cylindrical end surface facing radially inward, a first side surface extending from the end surface of the second tooth, and a second side surface extending from the end surface of the second tooth; each of the first side surface of the second tooth and the second side surface of the second tooth being angled in cross section with respect to the end surface of the second tooth.

In a further aspect, disclosed is a joint assembly comprising: a nut defining an inner cavity defining a conical portion; a grip ring positioned inside the inner cavity of the nut and comprising: a ring body defining an inner surface facing radially inward; a first tooth extending from the inner surface of the ring body, the first tooth defining an end surface facing radially inward, a first side surface extending from the end surface and towards the inner surface, and a second side surface extending from the end surface and towards the inner surface; each of the first side surface and the second side surface being angled in cross section with respect to the end surface; and a second tooth extending from the inner surface of the ring body and positioned adjacent to and offset from the first tooth, the second tooth defining an end surface facing radially inward, a first side surface extending from the end surface of the second tooth, and a second side surface extending from the end surface of the second tooth; each of the first side surface of the second tooth and the second side surface of the second tooth being angled in cross section with respect to the end surface of the second tooth; and a gasket positioned axially adjacent to the grip ring inside the inner cavity of the nut, the gasket defining an inner surface facing radially inward, an outer surface facing radially outward and facing the inner surface of the nut, and an axial end surface facing the grip ring.

In yet another aspect, disclosed is a method of connecting a pipe length to a piping element, the method comprising: sliding the pipe length through a nut, a gasket, and a grip ring; engaging the nut with the piping element, each of the gasket and the grip ring positioned between the pipe length and the piping element, the grip ring comprising: a ring body defining an inner surface facing radially inward; a first tooth extending from the inner surface of the ring body, the first tooth defining an end surface facing radially inward, a first side surface extending from the end surface and towards the inner surface, and a second side surface extending from the end surface and towards the inner surface; each of the first side surface and the second side surface being angled in cross section with respect to the tooth end surface; and a second tooth extending from the inner surface of the ring body and positioned adjacent to and offset from the first tooth, the second tooth defining an end surface facing radially inward, a first side surface extending from the end surface of the second tooth, and a second side surface extending from the end surface of the second tooth; each of the first side surface of the second tooth and the second side surface of the second tooth being angled in cross section with respect to the end surface of the second tooth; and tightening the nut against the piping element, wherein tightening the nut comprises contacting the end surface of each of the first tooth and the second tooth of the grip ring with an outer surface of the pipe length.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
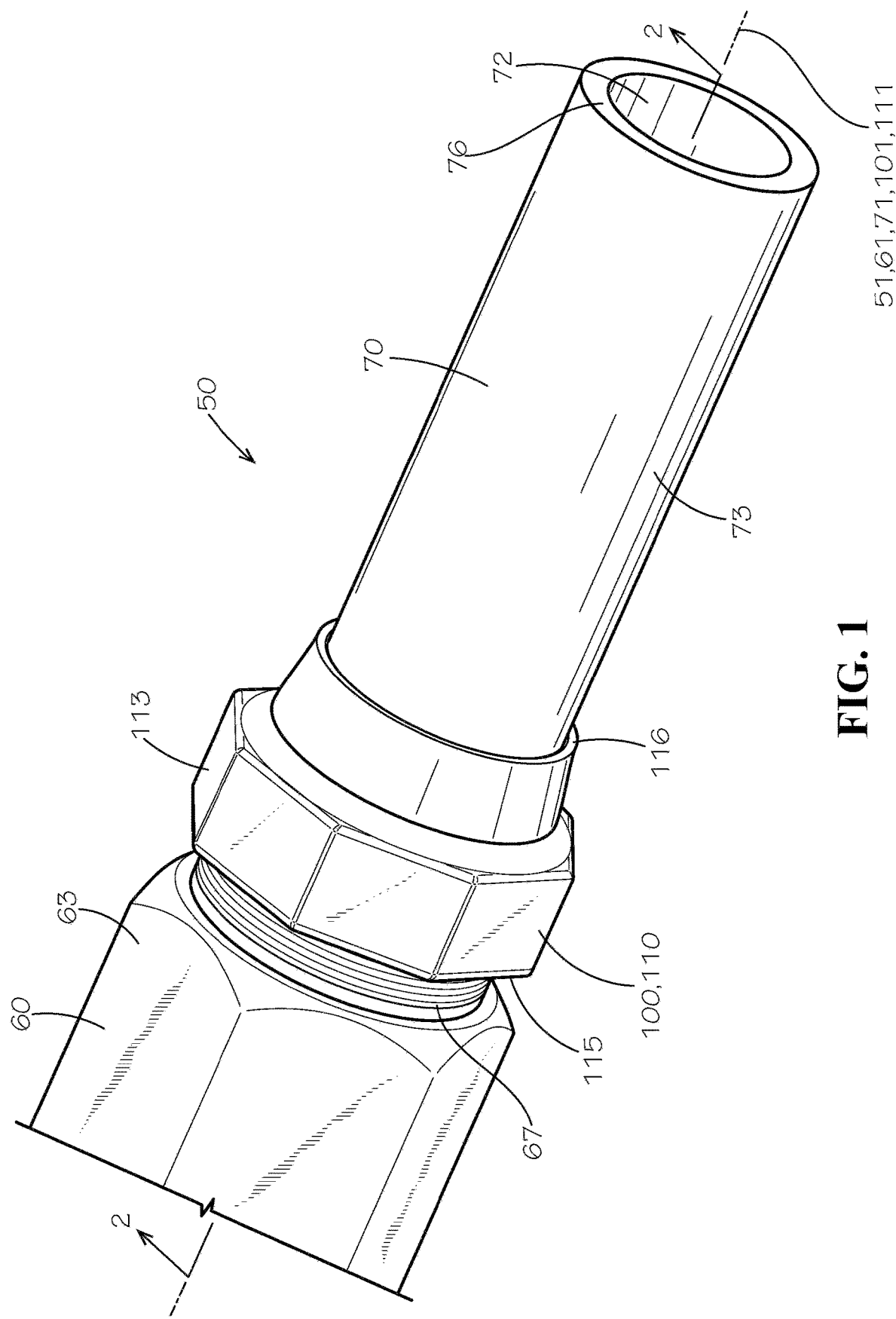
FIG. 1 is a perspective view of a joint assembly comprising a pipe length joined to a piping element with a fastener in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

In one aspect, a joint assembly and associated methods, systems, devices, and various apparatuses are disclosed herein. In one aspect, the joint assembly can comprise a grip ring.

FIG. 1 is a perspective view of a joint assembly 50 in accordance with one aspect of the current disclosure. The joint assembly 50 can be a grip connection assembly or a compression nut assembly or a compression fitting assembly. The joint assembly 50 can comprise a piping element 60 and can be joined to a pipe length 70. More specifically, the piping element 60 can be joined to the pipe length 70 with a fastener 100, which can be or can comprise a nut assembly. The piping element 60 can be any component of a fluid distribution system such as, for example, a valve, a fitting, an adapter, or a portion thereof. Each of the joint assembly 50, the piping element 60, the pipe length 70, and the fastener 100 can define respective axes 51,61,71,101, which can be coaxial in the present aspect.

The piping element 60 can define an inner surface 62 (shown in FIG. 2) and an outer surface 63, a first end 65 (shown in FIG. 2) and a second end (not shown) distal from the first end 65. The piping element 60 can define a threaded portion 67 with which the fastener 100 can be engaged. The piping element 60 can, at least in part, define a polygonal shape in axial cross-section, i.e., in a cross-section orthogonal (i.e., perpendicular) with respect to the axis 61 of the piping element 60. The polygonal shape can be configured to receive a tool for rotation of the piping element 60 with respect to a mating part such as a nut 110 of the fastener 100. For example and without limitation, the piping element 60 can define a hexagonal shape in axial cross-section, which can be configured to receive a hex tool such as, for example and without limitation, a hex wrench or adjustable wrench with opposing flat and parallel tool surfaces. The nut 110 itself can define an axis 111, and other components of the fastener 100 such as, for example and without limitation, a gasket 200, a washer 300, and a grip ring 400 (all shown in FIG. 2), can define respective axes 201,301,401 (shown in FIG. 2). Any one or more of the axes 51,61,71,101,111,201, 301,401 can be aligned with each other in an assembled condition of the joint assembly 50.

The pipe length 70 can define an inner surface 72, an outer surface 73, a first end 75 (shown in FIG. 2), and a second end 76 distal from the first end 75. As shown, either of the first end 75 and the second end 76 can define a plain end of the pipe length 70. A plain end of the pipe length 70 is an end of the pipe length 70 that has not been further formed beyond cutting to length and optionally "breaking" or "dressing" the cut edges, e.g., with a chamfer. Therefore the plain end of the pipe length 70 in cross-section can be substantially the same size and shape as a cross-section of the pipe length 70 at a distance from the first end 75 or the second end 76. A plain end of a typical pipe as well as the cross-section of the pipe length 70 at a distance from the first end 75 or the second end 76 can define the shape of a plain cylinder. The pipe length 70 can define an indeterminate length and follow any desired path and need not be straight and/or configured as shown.

The fastener 100 can comprise the nut 110. The fastener 100 can comprise the gasket 200 (shown in FIG. 2). The fastener 100 can comprise the washer 300. The fastener 100 can comprise the grip ring 400 (shown in FIG. 2).

As shown, the nut 110 can define an inner surface 112 (shown in FIG. 2), an outer surface 113, a first end 115, and a second end 116 distal from the first end 115. The nut 110 can, at least in part, define a polygonal shape in axial cross-section, i.e., in a cross-section orthogonal with respect to the axis 101 of the nut 110. The polygonal shape can be configured to receive a tool for rotation of the nut 110 with respect to the piping element 60. For example and without limitation, the nut 110 can define a hexagonal shape in axial cross-section, which can be configured to receive a hex tool such as, for example and without limitation, a hex wrench or adjustable wrench with opposing flat and parallel tool surfaces. As shown, the nut 110 can receive each of the piping element 60 and the pipe length 70.

Figure 2:
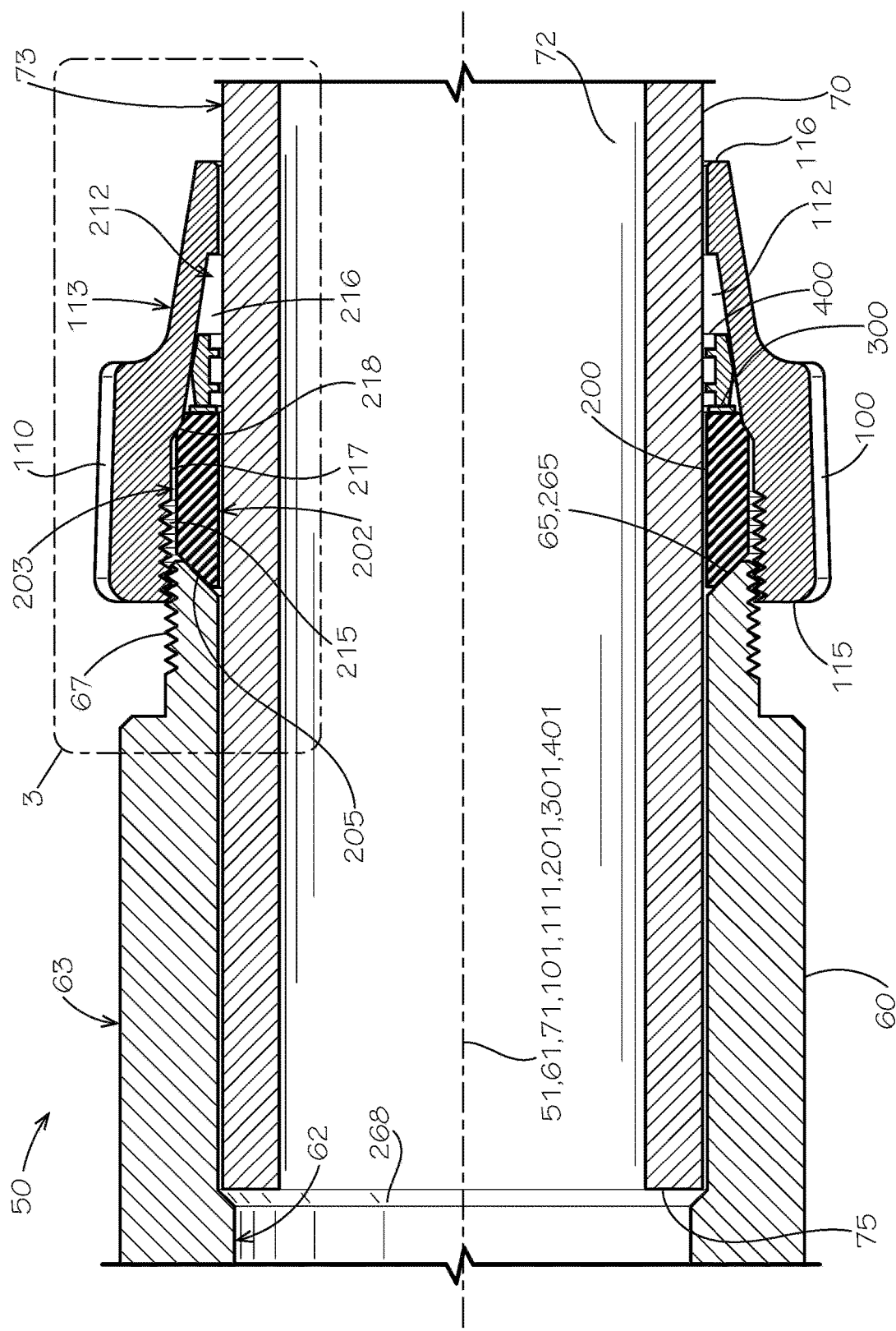
FIG. 2 is a sectional view of the joint assembly of FIG. 1 taken along line 2-2 of FIG. 1.

FIG. 2 is a sectional view of the joint assembly 50 taken along line 2-2 of FIG. 1. As shown, the pipe length 70 can be received within each of the piping element 60 and the fastener 100—and each portion thereof. More specifically, the inner surface 62 of the piping element 60 can face the outer surface 73 of the pipe length 70. As also shown, the piping element 60 be received within the fastener 100 and at least the nut 110 thereof. More specifically, an inner surface of respective components of the fastener 100 can face the outer surface 73 of the pipe length 70. The piping element 60 can define an end surface 265 at the first end 65, which can slope or be oblique with respect to a radial direction of the piping element 60. The piping element 60 can define an internal stop 268, which can be a stop shoulder limiting travel of the pipe length 70 there beyond.

The gasket 200 can define an inner surface 202, an outer surface 203, a first end 205, and a second end 206 (shown in FIG. 3) distal from the first end 205. The gasket 200 can, at least in part and in axial cross-section, define an annular or ring shape and can be received within the nut 110 and received about or around the pipe length 70.

The nut 110, which can define the inner surface 112, can define an inner cavity 212. The nut 110 and, more specifically, at least one of the inner surface 112 and the inner cavity 212 can define a first portion 215 proximate to the first end 115. The nut 110 can similarly define a second portion 216 proximate to the second end 116. The nut 110 can define a third portion 217, which can be defined between the first portion 215 and the second portion 216. The nut 110 can further define a fourth portion 218, which can be defined between the third portion 217 and the second portion 216.

The first portion 215 can be a threaded portion. The second portion 216 can be a conical portion. The third portion 217 can extend between the first portion 215 and the second portion 216 and can be a cylindrical portion as shown or a conical portion. The fourth portion 218 can extend between the third portion 217 and the second portion 216 and can be a conical portion as shown. As shown, the threaded or first portion 215 of the nut 110 can engage the threaded portion 67 of the piping element 60, or the nut 110 can be otherwise configured to secure the pipe length 70 to the piping element 60 in an assembled and tightened condition by fixing a position of the nut 110 with respect to the piping element 60 and/or fixing a position of the pipe length 70 with respect to the nut 110 and the piping element 60. As shown, the outer surface 113 of the nut 110 can define cylindrical and conical portions.

The inner cavity 212 of the nut 110 and, more specifically, the second portion 216 can contact the grip ring 400 in an assembled condition of the joint assembly 50—more specifically, in a loosened condition as shown or a tightened condition (shown in FIG. 9)—and in an assembled condition of the fastener 100. Either or both of the first portion 215 and the third portion 217 can face the outer surface 203 of the gasket 200 and, in some aspects, contact the gasket 200.

Figure 3:
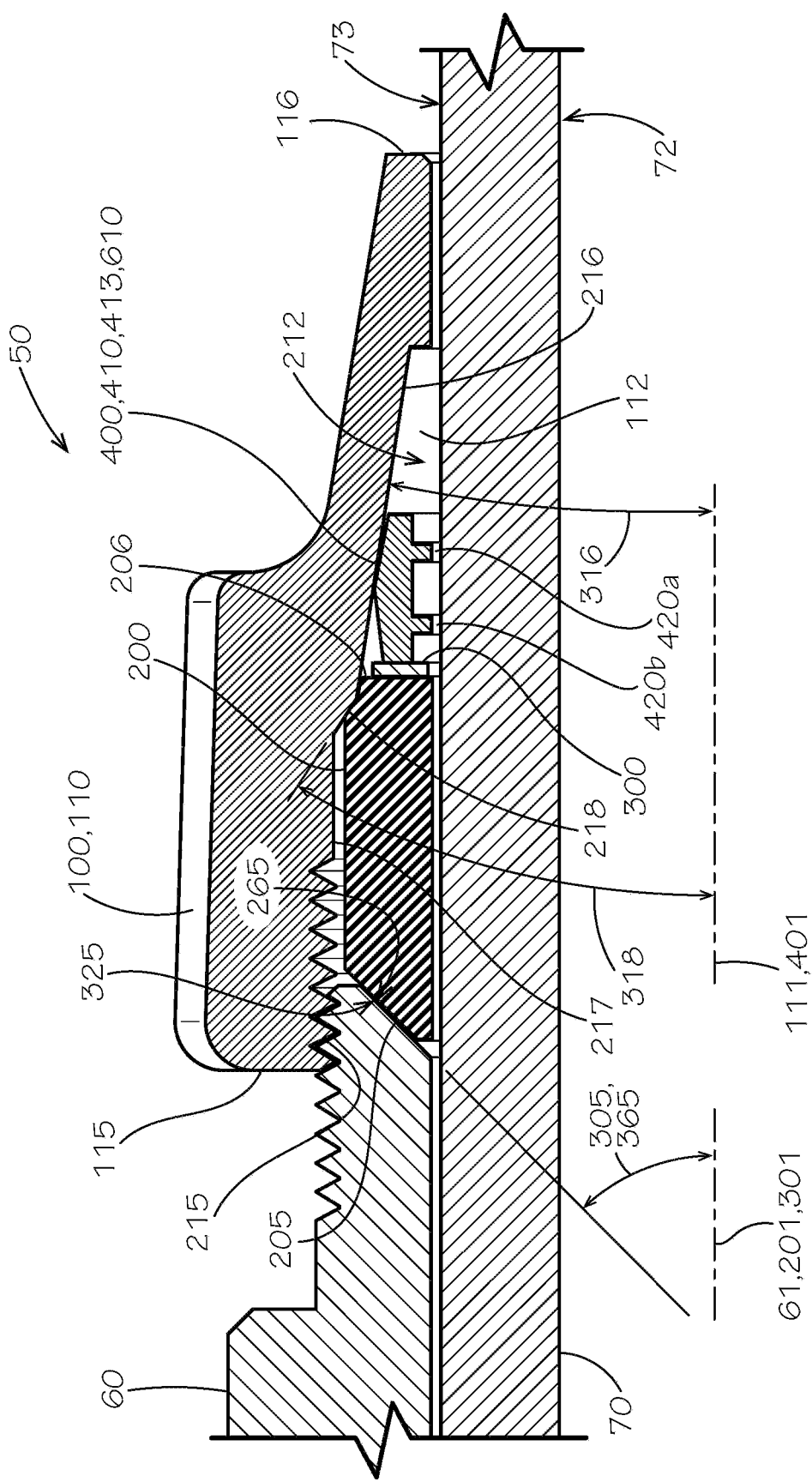
FIG. 3 is a detail sectional view of the joint assembly of FIG. 1 in a loosened condition taken from detail 3 of FIG. 2.

FIG. 3 is a detail sectional view of the joint assembly 50 (shown fully in FIG. 2) in a loosened condition taken from detail 3 of FIG. 2. The first end 205 of the gasket 200 can face and, more specifically, can contact the end surface 265 of the piping element 60. In some aspects, as shown, an end surface 325 of the gasket 200 can slope or be oblique with respect to a radial direction of the gasket 200. More specifically, the end surfaces 265,325 can define respective angles 305,365, which can be measured with respect to the respective axes 61,201. In some aspects, either or both of the angles 305,365 can measure 45 degrees. In some aspects, either or both of the angles 305,365 can measure a non-45 degree angle. In some aspects, the angles 305,365 can measure 90 degrees, i.e., the surfaces of respective ends 65,205 can be orthogonal to the respective axes 61,201.

Portions of the nut 110 can, in radial cross-section, define angles with respect to the axis 111. For example and without limitation, the second and fourth portions 216,218 of the inner cavity 212 of the nut 110 can define respective angles 316,318, which can be measured with respect to the axis 111. More specifically, the angle 318 of the fourth portion 218 can be different than—greater than, as shown, or less than—the angle 316 of the second portion 216. In some aspects, the angle 316 can measure less than 60 degrees. In some aspects, the angle 316 can measure less than 45 degrees. For example and without limitation, the angle 316 can measure 9 degrees. In some aspects, as described above, the inner surface 112 can define the fourth portion 218. In some aspects, the angle 318 defined by the fourth portion 218 can measure less than 90 degrees. In some aspects, the angle 318 can measure less than 60 degrees. In some aspects, the angle 318 can measure less than 45 degrees. In some aspects, the angle 318 can measure at least as large as the angle 316 and, optionally, also within one of the aforementioned ranges. For example and without limitation, the angle 318 can measure 32 degrees. In some aspects, the inner surface 112 need not define the fourth portion 218, and the second portion 216 can extend further towards the first end 115, the third portion 217 can extend further towards the second end 116, the angle 316 can be different than shown, and/or the second portion 216 and the third portion 217 can intersect. In some aspects, an increase or decrease in a size of the inner cavity 212 resulting from a change in shape of the inner surface 112 can be accompanied by a corresponding increase or decrease in a cross-sectional area of the gasket 200.

The grip ring 400, which can be a grip band, can be positioned inside the inner cavity 212 of the nut 110 and can comprise a ring body 410 and one or more teeth 420a,b. The gasket 200 can be positioned axially adjacent to the grip ring 400 inside the inner cavity 212 of the nut 110, with an axial end surface of the second end 206 facing the grip ring 400. The washer 300 can be positioned between—or, more specifically, axially between—the gasket 200 and the grip ring 400. A conical portion 610 of an outer surface 413 of the ring body 410 can be in mating contact with the conical second portion 216 of the inner cavity 212 of the nut 110 in an assembled condition of the fastener 100. The conical portion 610 of the outer surface 413 of the ring body 410 and the conical second portion 216 can work together to facilitate compression of the gasket 200 in an axial direction of the joint assembly 50 and also compression of the grip ring 400 in a radial direction towards and into the pipe length 70.

The washer 300 can define an inner surface, an outer surface, a first end, and a second end distal from the first end. The washer 300 can, at least in part and in axial cross-section, define an annular or ring shape and can be received within the nut 110 and received about or around the pipe length 70. In some aspects, the washer 300 can comprise a rigid material, which can mean that the material forming the washer 300 is non-compressible but not necessary inflexible. In some aspects, the washer 300 can comprise a material that is otherwise able to transfer a force from the grip ring 400 to the gasket 200 during tightening of the joint assembly 50. In some aspects, the washer 300 can be a separate component. In some aspects, the washer 300 can be formed together with or be adhered or otherwise fastened to the gasket 200 or the grip ring 400. As shown, a surface of the second end 206 of the gasket 200 and respective axial ends of the washer 300 and the grip ring 400 can be orthogonal to the respective axes 201,301,401. In some aspects, the fastener 100 need not comprise the washer 300. In some aspects, the washer 300 can facilitate tightening of the fastener 100 by reducing friction between parts. In other aspects, such friction can be overcome, reduced, or eliminated without the washer 300 by sufficient tightening of the fastener 100 or by other methods.

Figure 4:
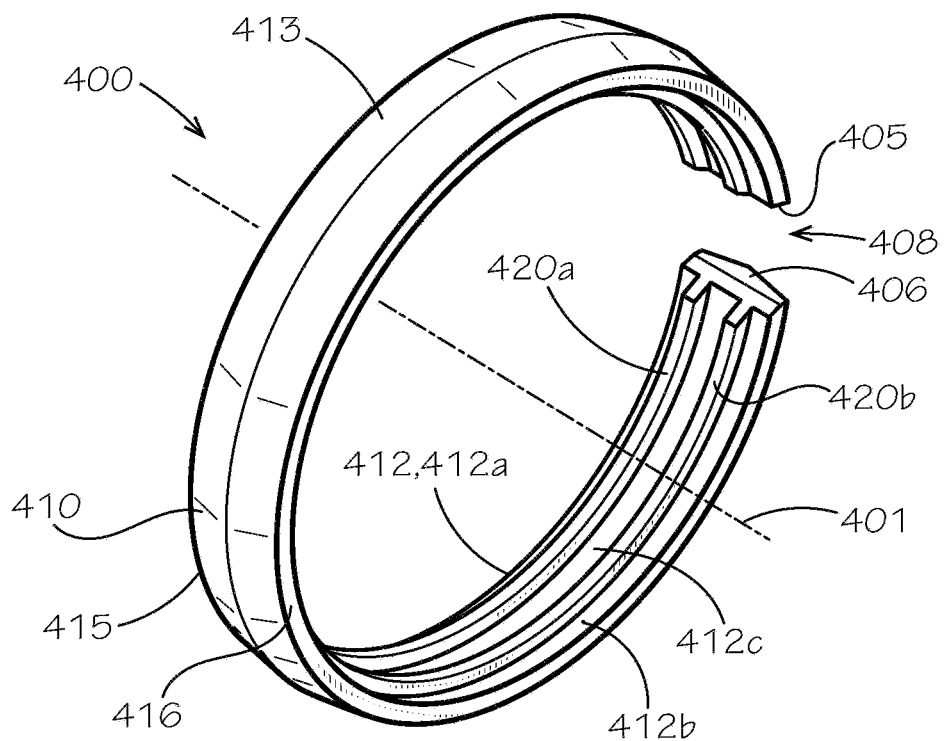
FIG. 4 is a perspective view of a grip ring of the fastener of the joint assembly of FIG. 1.
Figure 5:
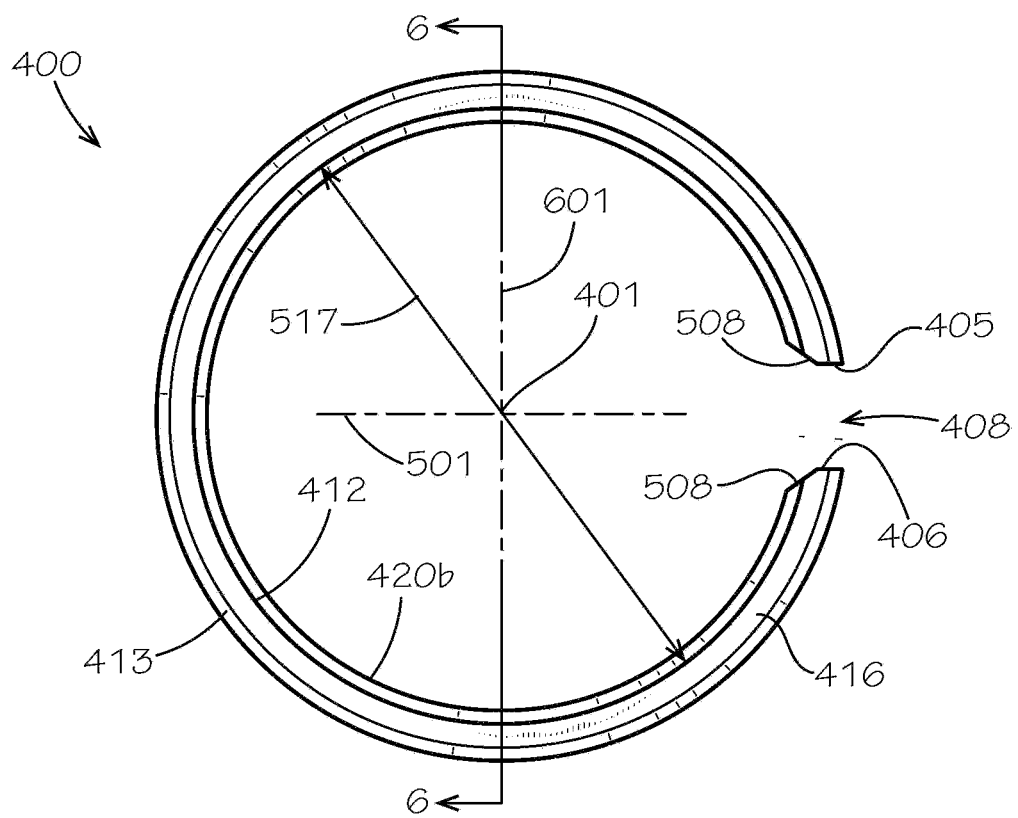
FIG. 5 is an axial end view of the grip ring of FIG. 4.

FIG. 4 is a perspective view and FIG. 5 is an axial end view of the grip ring 400 of the fastener 100 (shown in FIG. 1) of the joint assembly 50 (shown in FIG. 1). Referring to FIG. 4, again, the grip ring 400 can comprise the ring body 410 and the teeth 420a,b. The grip ring 400 and, more specifically, the ring body 410 can define an inner surface 412, the outer surface 413, a first axial end 415, and a second axial end 416 distal from the first axial end 415. The grip ring 400 can further define a first circumferential end 405 and a second circumferential end 406, which can define a gap 408 therebetween. The gap 408 can facilitate a compression of the grip ring 400 in a radial direction with respect to the axis 401, even when the grip ring 400 is formed from a rigid material. More specifically, each of the circumferential ends 405,406 can define an edge treatment or edge relief 508 (shown in FIG. 5) such as, for example and without limitation, a chamfer or a radius as shown. As shown, the chamfer can be angled at, for example and without limitation, 30 to 40 degrees with respect to a horizontal axis 501 (shown in FIG. 5) of the grip ring 400, which is orthogonal to a vertical centerline 601 (shown in FIG. 5). The grip ring 400 can, at least in part and in axial cross-section, define an annular or ring shape and, as shown in FIG. 3, can be received within the nut 110 (shown in FIG. 3) and received about or around the pipe length 70 (shown in FIG. 3). In some aspects, as noted above, the grip ring 400 can comprise a rigid material, which can mean that the material forming the grip ring 400 is non-compressible but not necessary inflexible. In some aspects, the grip ring 400 can comprise a material that is otherwise able to transfer a force from the nut 110 to the gasket 200 (shown in FIG. 2) during tightening of the joint assembly 50.

The inner surface 412 of the ring body 410 can face radially inward and can comprise a first portion 412a proximate to the first axial end 415 of the ring body 410, a second portion 412b proximate to the second axial end 416 of the ring body 410, and a third portion 412c defined in an axial position between the first portion 412a and the second portion 412b and, more specifically, in an axial position between the first tooth 420a and the second tooth 420b. Each of the first portion 412a, the second portion 412b, and the third portion 412c can define a common inner diameter 517 (shown in FIG. 5), which can be centered about the axis 401. As suggested above, the inner diameter 517 can be reduced by compression of the grip ring 400 during assembly and tightening of the joint assembly 50.

Figure 6:
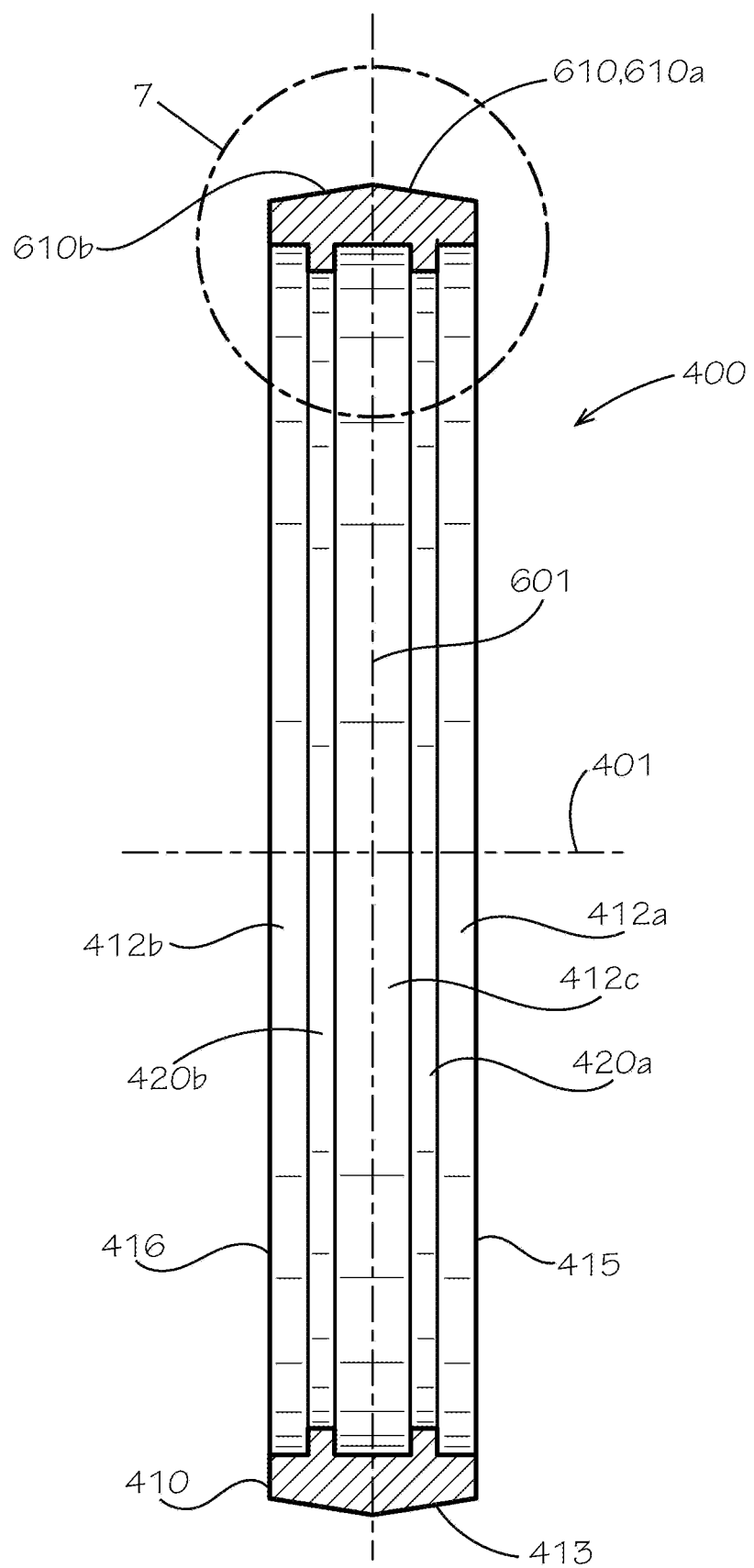
FIG. 6 is a sectional view of the grip ring of FIG. 4 taken along line 6-6 of FIG. 5.

FIG. 6 is a sectional view of the grip ring 400 taken along line 6-6 of FIG. 5. The outer surface 413, which can face radially outward, can comprise the conical portion 610 extending from one of the axial ends 415,416 of the ring body 410. The outer surface 413 can comprise two conical portions 610a,b. Again, as described above, the conical portion 610 or, in some aspects, the conical portions 610a,b of the outer surface 413 of the ring body 410 can be in mating contact with the conical second portion 216 (shown in FIG. 3) of the inner cavity 212 (shown in FIG. 3) of the nut 110 (shown in FIG. 3) in an assembled condition of the fastener 100 (shown in FIG. 3). As shown, the grip ring 400 can be symmetrical about the vertical centerline 601 angled at 90 degrees with respect to the axis 401 of the grip ring 400. For example and without limitation, the conical portion 610 can be the first conical portion 610a, which can extend from the first axial end 415; and the outer surface 413 can further comprise the second conical portion 610b, which can extend from the second axial end 416 of the ring body 410. Each of the conical portion 610, the first conical portion 610a, and the second conical portion 610b can be angled at an angle of 9 degrees with respect to the axis 401. In some aspects, each of the conical portion 610, the first conical portion 610a, and the second conical portion 610b can measure less than 9 degrees or less than 9 degrees. In some aspects, the grip ring 400 can be asymmetrical about the vertical centerline 601.

Figure 7:
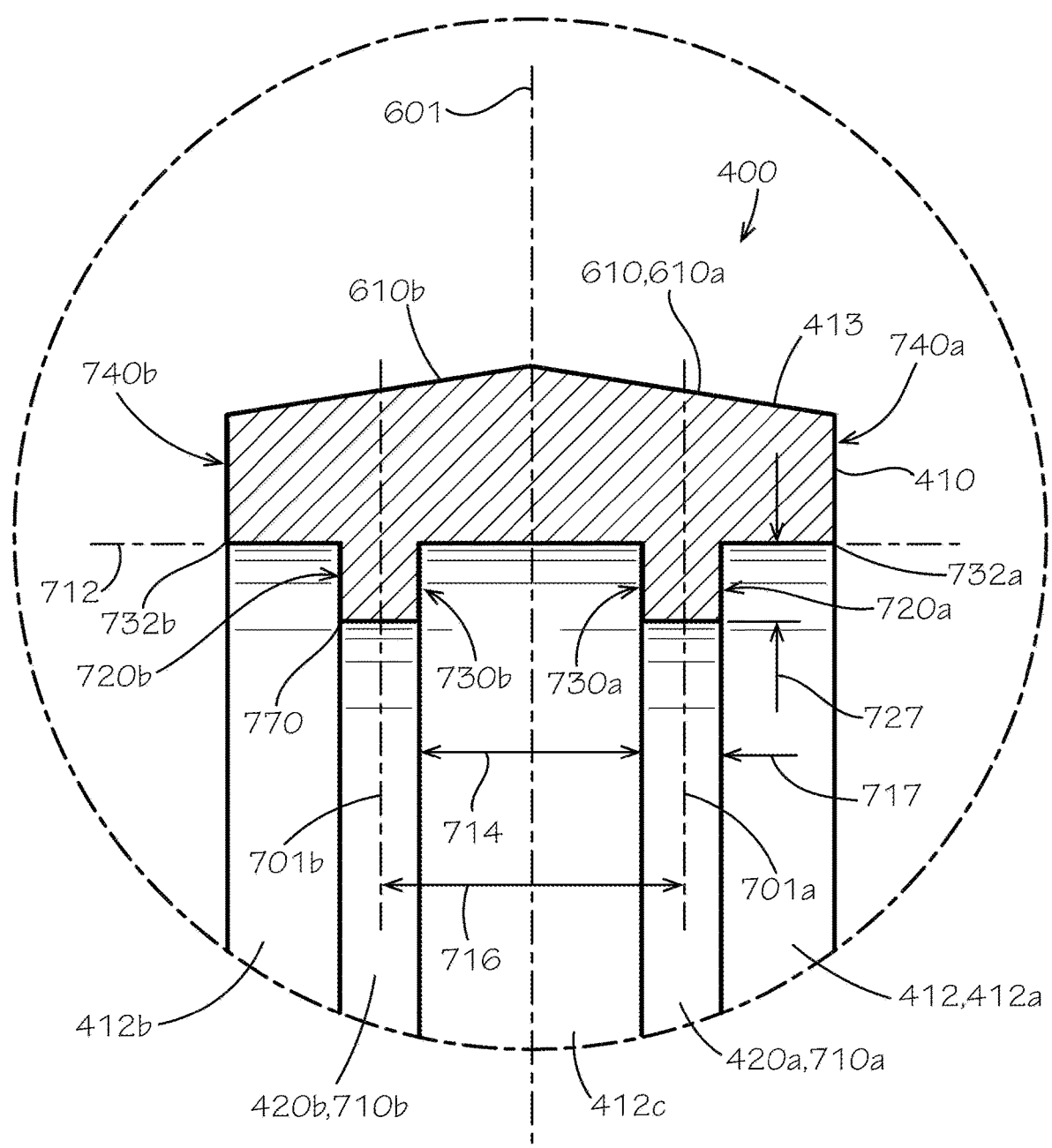
FIG. 7 is a detail sectional view of the grip ring of FIG. 4 taken from detail 7 of FIG. 6.

FIG. 7 is a detail sectional view of the grip ring 400 taken from detail 7 of FIG. 6. As shown, each of the first tooth 420a and the second tooth 420b can extend from the inner surface 412 of the ring body 410. Also as shown, each of the first portion 412a, the second portion 412b, and the third portion 412c of the inner surface 412 can be collinear in radial cross-section along a line 712. In some aspects, the portions 412a,b,c can prevent the teeth 420a,b from biting too far into the pipe length 70 when the joint assembly 50 is tightened. As the teeth 420a,b contacts and then penetrates the outer surface 73 of the pipe length 70, a depth of penetration can be limited by a radial height 727 of the tooth 420*a,b* and, more specifically, by one or more the portions 412*a,b,c* of the inner surface 412.

The first tooth 420*a* can define an end surface 710*a* facing radially inward. The first tooth 420*a* can define a first side surface 720*a* and a second side surface 730*a*. The first side surface 720*a* can extend from the end surface 710*a* and towards the inner surface 412 and, more specifically, the first portion 412*a*; while the second side surface 730*a* can extend from the end surface 710*a* and towards the inner surface 412 and, more specifically the third portion 412*c*. Each of the first side surface 720*a* and the second side surface 730*a* of the first tooth 420*a* can be angled in radial cross section with respect to the end surface 710*a*.

Similarly, the second tooth 420*b* can be positioned axially adjacent to and can be offset from the first tooth 420*a* by edge-to-edge spacing 714 or a center-to-center spacing 716. The second tooth 420*b* can define an end surface 710*b* facing radially inward. The second tooth 420*b* can define a first side surface 720*b* and a second side surface 730*b*. The first side surface 720*b* can extend from the end surface 710*b* and towards the inner surface 412 and, more specifically, the second portion 412*b*; while the second side surface 730*b* can extend from the end surface 710*b* and towards the inner surface 412 and, more specifically the third portion 412*c*. Each of the first side surface 720*b* and the second side surface 730*b* of the second tooth 420*b* can be angled in radial cross section with respect to the end surface 710*b*. More specifically, the end surfaces 710*a,b* of the respective teeth 420*a,b* can define a cylindrical shape, as can the inner surface 412 and the inner surfaces 412*a,b,c* of the ring body 410.

At least a portion of each of the first side surface 720*a* and the second side surface 730*a* of the first tooth 420*a* can be orthogonal in radial cross section to the end surface 710*a* of the first tooth 420*a*. Similarly, at least a portion of each of the first side surface 720*b* and the second side surface 730*b* of the second tooth 420*b* can be orthogonal in radial cross section to the end surface 710*b* of the second tooth 420*b*. In some aspects, as shown, the entire first side surface 720*a* and the second side surface 730*a* of the first tooth 420*a* can be orthogonal in radial cross section to the end surface 710*a* of the first tooth 420*a*; and, similarly, the entire first side surface 720*b* and the second side surface 730*b* of the second tooth 420*b* can be orthogonal in radial cross section to the end surface 710*b* of the second tooth 420*b*. In other aspects, only a portion of one or both of the first side surface 720*a* and the second side surface 730*a* of the first tooth 420*a* proximate to the end surface 710*a* of the first tooth 420*a* can be orthogonal in radial cross section to the end surface 710*a*; and, similarly, only a portion of one or both of first side surface 720*b* and the second side surface 730*b* of the second tooth 420*b* can be orthogonal in radial cross section to the end surface 710*b*. When at least a portion of each of the first side surface 720*a,b* and the second side surface 730*a,b* of the corresponding tooth 420*a,b* is orthogonal in radial cross section to the end surface 710*a* of the first tooth 420*a*, each tooth 420*a,b* can be said to have a 90-degree or perpendicular-to-pipe angle of attack.

The radial height 727 of each of the first tooth 420*a* and the second tooth 420*b* can relate to an axial length 717 of each of the first tooth 420*a* and the second tooth 420*b*. More specifically, in some aspects, an aspect ratio of the radial height versus the axial length can be 1:1, in which case a cross-section of the tooth 420*a,b* can be square-shaped. In some aspects, the aspect ratio of the radial height versus the axial length can be at least 1:1, In some aspects, the aspect ratio can be between 2.5:3 (approximately 0.83:1) and 1.1:1.

In some aspects, the aspect ratio can be between 2:3 (approximately 0.67:1) and 3:2 (1.5:1). As shown, the radial height 727 can be measured in a radial direction, which is parallel to the vertical centerline 601, and the axial length 717 can be measured in an axial direction parallel to the axis 401 (shown in FIG. 6). In some aspects, as shown, the side surfaces 720*a*,730*a* can be parallel to each other, and the side surfaces 720*b*,730*b* can be parallel to each other.

Intersections of each of the first side surfaces 720*a,b* and the second side surfaces 730*a,b* of the corresponding teeth 420*a,b* with the respective end surfaces 710*a,b* of the corresponding teeth 420*a,b* can define sharp edges 770. A "sharp edge" such as any of the sharp edges 770 can be defined as a non-radiused and non-chamfered edge or the equivalent in which two surfaces, in cross-section, intersect without either first changing direction.

As noted above, the grip ring 400 can comprise only a single instance of the teeth 420*a,b* (i.e., a single tooth extending from the inner surface 412). In some aspects, a vertical centerline 701*a,b* of the respective single tooth 420*a,b* can be aligned with the vertical centerline 601 of the grip ring 400. In some aspects, a vertical centerline 701*a,b* of the respective single tooth 420*a,b* can be offset in an axial direction from the vertical centerline 601 of the grip ring 400. In some aspects, including when the grip ring 400 comprises only a single instance of the teeth 420*a,b*, another portion of the grip ring 400 such as, for example and without limitation, a portion of the inner surface 412 intersecting either of axial end surfaces 740*a,b* of the grip ring 400, which can define respective edges 732*a,b*, can help prevent over-rotation of the grip ring 400 with respect to the fastener 100, the pipe length 70 and/or other surrounding portions of the joint assembly 50. More specifically, as desired, rotation of the grip ring 400 or, more specifically, the vertical centerline 601 of the grip ring 400 with respect to surrounding portions of the joint assembly 50 can be limited by contact of either of the edges 732*a,b* with the outer surface 73 of the pipe length 70.

Figure 8A:
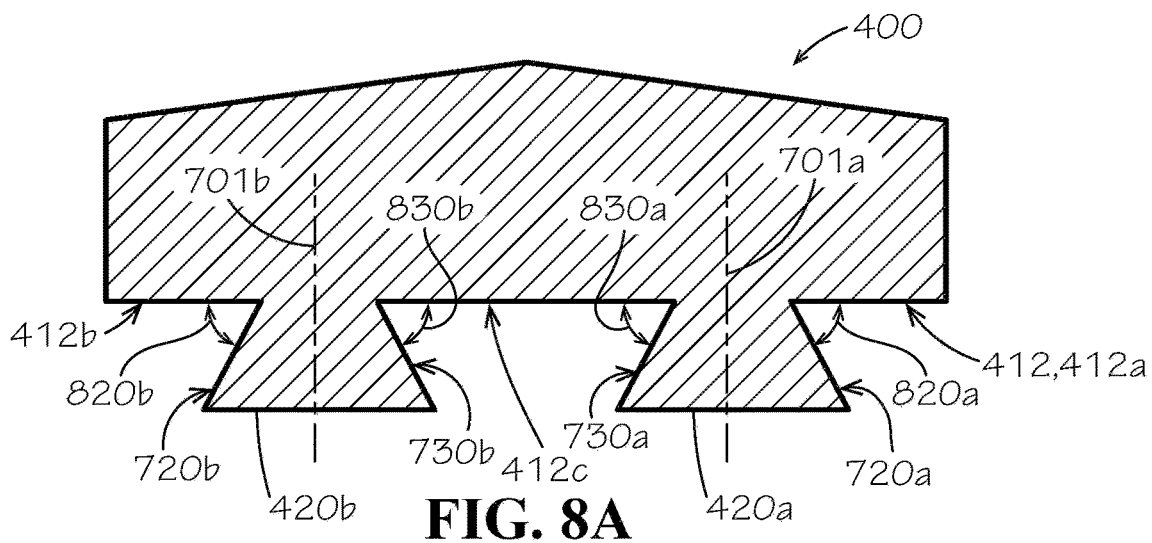
FIG. 8A is a detail sectional view of the grip ring of FIG. 4 in accordance with another aspect of the current disclosure and showing just the sectional geometry.
Figure 8B:
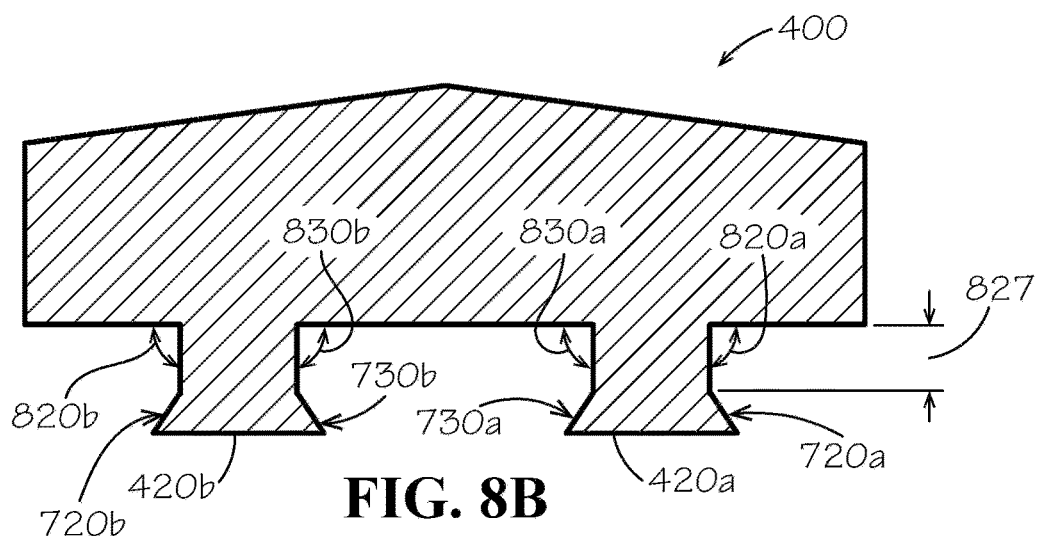
FIG. 8B is a detail sectional view of the grip ring of FIG. 4 in accordance with another aspect of the current disclosure and showing just the sectional geometry.
Figure 8C:
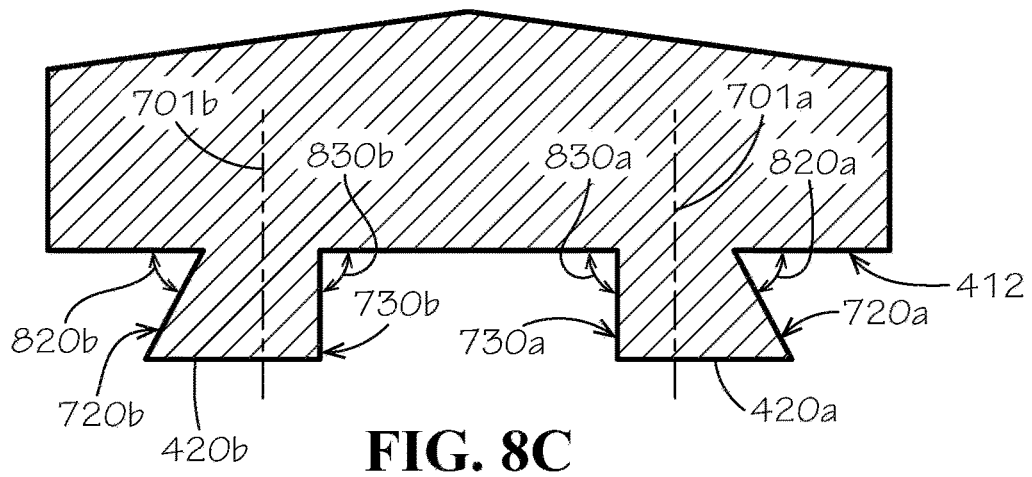
FIG. 8C is a detail sectional view of the grip ring of FIG. 4 in accordance with another aspect of the current disclosure and showing just the sectional geometry.

FIGS. 8A-8C are detail sectional views of the grip ring 400 of FIG. 4 in accordance with other aspect of the current disclosure and showing just the sectional geometry. As shown in FIG. 8A, angles 820*a,b* between the respective side surfaces 720*a,b* and the respective inner surfaces 412*a,b* and/or the axis 401 of the grip ring 400 can define an acute angle. Similarly as shown, angles 830*a,b* between the respective side surfaces 730*a,b* and the inner surface 412*c* and/or the axis 401 of the grip ring 400 can define an acute angle. In a complementary fashion, an angle can be formed between the side surfaces 720*a*,730*a* and the vertical centerline 701*a*, and an angle can be formed between the side surfaces 720*b*,730*b* and the vertical centerline 701*b*. Each of the teeth 420*a,b* can, at least in part, define a trapezoidal shape.

As shown in FIG. 8B, the aforementioned trapezoidal shape of the teeth 420*a,b* can begin at a point radially inward from the inner surface 412 and the base of the respective teeth 420*a,b*. More specifically, a portion of the side surfaces 720*a,b* or the side surfaces 730*a,b* can be angled with respect to the respective inner surfaces 412*a,b,c* and/or the axis 401 of the grip ring 400 starting at a radial offset distance 827 from the inner surface 412*a,b,c* or, more generally, from the inner surface 412.

As shown in FIG. 8C, at least one of the teeth 420*a,b* can be asymmetrical about the respective vertical centerlines 701*a,b*. More specifically, the angles 820*a,b* can be different than the angles 830*a,b*. In some aspects, each of the teeth 420a,b can define a rhombus in cross-section such that, for example and without limitation, one or both of the angles 830a,b are obtuse angles.

The components of the joint assembly 50 and, more specifically, the fastener 100 and any portion thereof can be formed from any one of a variety of materials selected based on their strength characteristics, weight, and cost. In some aspects, it will be beneficial to select a material with sufficient strength to avoid deformation, corrosion, or fatigue in use.

At least the piping element 60, the pipe length 70, the nut 110, the washer 300, and the grip ring 400 can be formed from or comprise a rigid material such as, for example and without limitation, metal. In other aspects, another material can be used for any parts formed from or comprising a rigid material such as, for example and without limitation, a composite material, or a polymer resin—including of the fiber-reinforced kind.

In some aspects, the grip ring 400 can be formed from a brass alloy material or, more specifically, a brass material such as, for example and without limitation, brass ASTM B505 alloy C83600 or equivalent. In some aspects, including in corrosive environments, the grip ring 400 can be formed from stainless steel. In some aspects, the grip ring 400 can be formed from non-stainless steel. In some aspects, including when the pipe length 70 is formed from a polymer resin such as, for example and without limitation, high-density polyethylene (HDPE), the grip ring 400 can be formed from a harder polymer resin (that is, harder than a material forming the pipe length 70) such as, for example and without limitation, acetal. Components that generally deform such as the grip ring 400 (shown in FIG. 4) can be configured and selected to deform in at least one orientation, in which case a material with appropriate characteristics can be used. In other aspects, another material can be used for the parts configured to deform such as, for example and without limitation, a metal such as spring steel or a rubber-like flexible material. The gasket 200, for example, can be formed from a flexible, resilient material such as natural or synthetic rubber such as, for example and without limitation, ethylene propylene diene monomer (EPDM) rubber or nitrile rubber, which is also known as Buna-N. The pipe length 70 can be formed from any suitable and available material such as, for example and without limitation, copper (soft or hard) or HDPE. In some aspects, to facilitate secure engagement of the fastener 100 and, more specifically, the grip ring 400 with the pipe length 70, a material can be chosen for the grip ring 400 that is harder than the material from which the pipe length 70 is formed. In some aspects, a material forming the grip ring 400 can be harder than the material from which the pipe length 70 is formed.

In some aspects, the joint assembly 50 or portions thereof can be formed from traditional material forming processes such as casting, extruding, and machining. In some aspects, the structure can be formed from a powder in a 3D printing or other additive manufacturing process, from pellets in a molding process, or from another raw material form and forming process.

Figure 9:
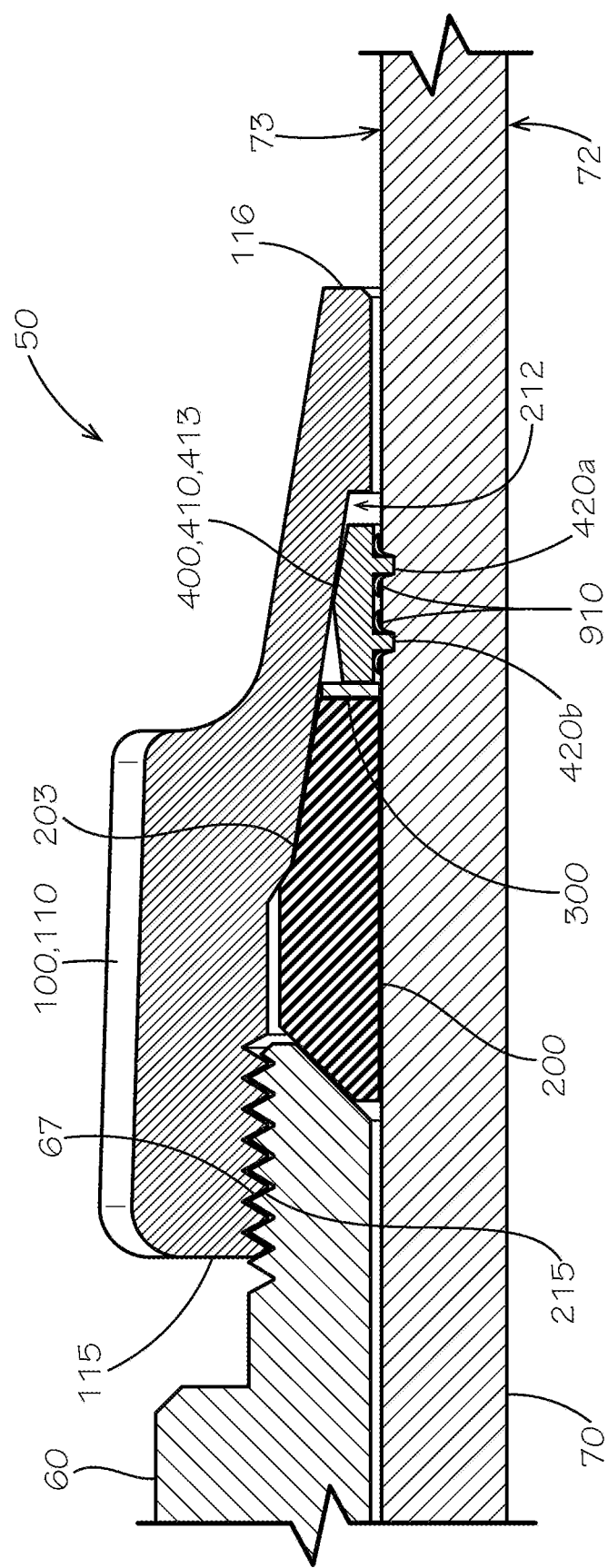
FIG. 9 is a detail sectional view of the joint assembly of FIG. 1 in a tightened condition similar to detail 3 of FIG. 2.

FIG. 9 is a detail sectional view of the joint assembly 50 (shown fully in FIG. 2) in a tightened condition taken from detail 3 of FIG. 2. As shown, the threaded first portion 215 of the nut 110 can be engaged with some or all of the threaded portion 67 of the piping element 60. As a result of such further engagement and tightening of the fastener 100, the nut 110 can contact the outer surface 413 of the grip ring 400 and move the grip ring 400 towards the gasket 200, compressing the gasket 200 to seal a space inside the inner cavity 212 of the nut 110 and, more specifically, to seal between the piping element 60 and the pipe length 70 and between the fastener 100 and each of the piping element 60 and the pipe length 70. As shown, tightening of the nut 110 can also move the grip ring 400 in a radial direction towards the pipe length 70 and even into and beyond the outer surface 73 of the pipe length 70. More specifically, the teeth 420a,b of the grip ring 400 can cut into the outer surface 73. Instead of the grip ring 400 dragging across the outer surface 73 of the pipe length 70, as is typical for at least some previously existing "gripper" designs, the grip ring 400 can cut or dig into the pipe length 70 and significantly increase the normal force of tooth bite, i.e., the force acting perpendicular to the outer surface 73 of the pipe length 70 between the teeth 420a,b and the outer surface 73.

In some aspects, for example with the geometry disclosed, the normal force directed against the outer surface 73 of the pipe length 70 by the teeth 420a,b and/or the resistance to pull out of the pipe length 70 from the joint assembly 50 can be increased significantly in comparison to previously existing "gripper" designs.

With pointed teeth, as the nut 110 is tightened, the surface area of a portion of the teeth in contact with the outer surface 73 of the pipe length 70 can generally increase and the overall torque required to tighten the nut 110 can also increase. Yet, in the case of pointed teeth, as the surface area also increases as the teeth are pressed into or dragged across a material such as that forming the outer surface 73, the force over any given area of the outer surface 73, i.e., the pressure applied by the teeth, can actually decrease or at least reach a maximum because the force applied by a technician is thereby distributed across the increased surface area. For technicians doing a field installation without torque wrenches to confirm adequate tightening, a technician may not reach even the torque required for a minimum grip, much less a maximum or optimal grip.

In contrast, with a fastener 100 comprising the grip ring 400 with square teeth 420a,b (broadly defined here as covering teeth 420a,b of any aspect ratio) as disclosed, a surface area of the teeth 420a,b in contact with the outer surface 73 of the pipe length 70 through the use of square teeth instead of the typical thread-shaped teeth remains constant, and a minimum or even optimal torque for a properly tightened joint assembly 50 can much more easily be reached. In addition, use of fewer teeth 420a,b (for example, two teeth 420a,b as shown versus six teeth as is typical) can by itself significantly increase the tooth bite, and can thereby increase a corresponding grip tensile force. In fact, tightening of the nut 110 can cause the grip ring 400 to create a chip or chips 910 from the material cut from the outer surface 73 of the pipe length 70, which can further facilitate a secure joint assembly 50. As a result, the aforementioned significant increase in grip tensile force can be achieved.

A method of connecting the piping element 60 to the pipe length 70 can comprise sliding the pipe length 70 through the fastener 100 and, more specifically, one or more of the nut 110, the gasket 200, and the grip ring 400. The method can comprise engaging the fastener 100 and, more specifically, the nut 110 with the piping element 60. The method can comprise tightening the fastener 100 and, more specifically, the nut 110 against the piping element 60, wherein tightening the nut 110 can comprise contacting the end surface 710a,b of each of the first tooth 420a and the second tooth 420b of the grip ring 400 with the outer surface 73 of the pipe length 70.

The method can further comprise compressing the gasket 200 to seal a space between the grip ring 400 and the piping element 60 and the pipe length 70. The method of contacting the end surface 710a,b of each of the first tooth 420a and the second tooth 420b of the grip ring 400 with the outer surface 73 of the pipe length 70 can comprise cutting material from the outer surface 73 of the pipe length 70. The method of cutting material from the outer surface 73 of the pipe length 70 can comprise forming a chip 910 from the material cut from the outer surface 73 of the pipe length 70.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A grip ring comprising:
   a ring body defining an inner surface facing radially inward;
   a first tooth extending from the inner surface of the ring body, the first tooth defining a cylindrical end surface facing radially inward, a first side surface extending from the end surface and towards the inner surface, and a second side surface extending from the end surface and towards the inner surface; each of the first side surface and the second side surface being angled in cross section with respect to the end surface, an angle between the inner surface and the first side surface being acute, the first side surface defining an axially outermost side surface of the first tooth; and
   a second tooth extending from the inner surface of the ring body and positioned adjacent to and offset from the first tooth, the second tooth defining a cylindrical end surface facing radially inward, a first side surface extending from the end surface of the second tooth, and a second side surface extending from the end surface of the second tooth; each of the first side surface of the second tooth and the second side surface of the second tooth being angled in cross section with respect to the end surface of the second tooth.

2. The grip ring of claim 1, wherein intersections of each of the first side surface and the second side surface of the first tooth with the end surface of the first tooth and intersections of each of the first side surface and the second side surface of the second tooth with the end surface of the second tooth define sharp edges.

3. The grip ring of claim 1, wherein the grip ring is symmetrical about an axial centerline angled at 90 degrees with respect to an axis of the grip ring.

4. The grip ring of claim 1, wherein the inner surface of the ring body is cylindrical in shape.

5. The grip ring of claim 1, wherein:
   a portion of the second side surface of the first tooth is orthogonal in cross section to the end surface of the first tooth, and
   a portion of the second side surface of the second tooth are orthogonal in cross section to the end surface of the second tooth.

6. The grip ring of claim 1, wherein an aspect ratio of a radial height versus an axial length of each of the first tooth and the second tooth is in a range of 2:3 to 3:2.

7. The grip ring of claim 1, wherein the ring body further defines an outer surface facing radially outward, the outer surface comprising a conical portion extending from an axial end of the ring body.

8. The grip ring of claim 1, wherein the inner surface of the ring body of the grip ring comprises a first portion proximate to a first axial end of the grip ring, a second portion proximate to a second axial end of the grip ring, and a third portion defined in an axial position between the first tooth and the second tooth; each of the first portion, the second portion, and the third portion defining a common inner diameter with respect to an axis of the grip ring.

9. The grip ring of claim 1, wherein an angle between the inner surface and the first side surface of the second tooth is acute, the first side surface of the second tooth defining an axially outermost side surface of the second tooth.

10. A joint assembly comprising:
    a nut defining an inner cavity defining a conical portion;
    a grip ring positioned inside the inner cavity of the nut and comprising:
    a ring body defining an inner surface facing radially inward;
    a first tooth extending from the inner surface of the ring body, the first tooth defining an end surface facing radially inward, a first side surface extending from the end surface and towards the inner surface, and a second side surface extending from the end surface and towards the inner surface; each of the first side surface and the second side surface being angled in cross section with respect to the end surface, an angle between the inner surface and the first side surface being acute, the first side surface defining an axially outermost side surface of the first tooth; and
    a second tooth extending from the inner surface of the ring body and positioned adjacent to and offset from the first tooth, the second tooth defining an end surface facing radially inward, a first side surface extending from the end surface of the second tooth, and a second side surface extending from the end surface of the second tooth; each of the first side surface of the second tooth and the second side surface of the second tooth being angled in cross section with respect to the end surface of the second tooth; and a gasket positioned axially adjacent to the grip ring inside the inner cavity of the nut, the gasket defining an inner surface facing radially inward, an outer surface facing radially outward and facing the inner surface of the nut, and an axial end surface facing the grip ring.

11. The joint assembly of claim 10, wherein the ring body further defines an outer surface facing radially outward, the outer surface of the ring body comprising a conical portion extending from an axial end of the ring body, the conical portion of the outer surface of the ring body being in mating contact with the conical portion of the inner cavity of the nut in an assembled condition.

12. The joint assembly of claim 10, wherein intersections of each of the first side surface and the second side surface of the first tooth with the end surface of the first tooth and intersections of each of the first side surface and the second side surface of the second tooth with the end surface of the second tooth define sharp edges.

13. The joint assembly of claim 10, further comprising a washer positioned between the grip ring and the gasket, the washer comprising a rigid material.

14. The joint assembly of claim 10, wherein each of the axial end surface of the gasket and an axial end surface of the grip ring is orthogonal to an axis of the gasket.

15. The joint assembly of claim 10, further comprising a pipe length and a piping element, each of the nut and the piping element defining a threaded portion, the threaded portion of the nut engaging the threaded portion of the piping element, the pipe length received within each of the nut and the piping element, the nut configured to secure the pipe length to the piping element in an assembled and tightened condition by fixing a position of the pipe length relative to the nut and the piping element.

16. The joint assembly of claim 10, wherein an angle between the inner surface and the first side surface of the second tooth is acute, the first side surface of the second tooth defining an axially outermost side surface of the second tooth.

17. A method of connecting a pipe length to a piping element, the method comprising:
  sliding the pipe length through a nut, a gasket, and a grip ring;
  engaging the nut with the piping element, each of the gasket and the grip ring positioned between the pipe length and the piping element, the grip ring comprising:
    a ring body defining an inner surface facing radially inward;
    a first tooth extending from the inner surface of the ring body, the first tooth defining an end surface facing radially inward, a first side surface extending from the end surface and towards the inner surface, and a second side surface extending from the end surface and towards the inner surface; each of the first side surface and the second side surface being angled in cross section with respect to the end surface; and
    a second tooth extending from the inner surface of the ring body and positioned adjacent to and offset from the first tooth, the second tooth defining an end surface facing radially inward, a first side surface extending from the end surface of the second tooth, and a second side surface extending from the end surface of the second tooth; each of the first side surface of the second tooth and the second side surface of the second tooth being angled in cross section with respect to the end surface of the second tooth;
    wherein intersections of each of the first side surface and the second side surface of the first tooth with the end surface of the first tooth define sharp edges; and
    wherein the inner surface of the ring body of the grip ring comprises a first portion proximate to a first axial end of the grip ring, a second portion proximate to a second axial end of the grip ring, and a third portion defined in an axial position between the first tooth and the second tooth; each of the first portion, the second portion, and the third portion defining a common inner diameter with respect to an axis of the grip ring; and
  tightening the nut against the piping element, wherein tightening the nut comprises contacting the end surface of each of the first tooth and the second tooth of the grip ring with an outer surface of the pipe length.

18. The method of claim 17, further comprising compressing the gasket to seal a space between the grip ring and the piping element and the pipe length.

19. The method of claim 17, wherein contacting the end surface of each of the first tooth and the second tooth of the grip ring with the outer surface of the pipe length comprises cutting material from the outer surface of the pipe length.

20. The method of claim 19, wherein cutting material from the outer surface of the pipe length comprises forming a chip from the material cut from the outer surface of the pipe.

21. The method of claim 20, wherein cutting material from the outer surface of the pipe length comprises receiving the chip within a space defined by the first portion of the inner surface of the ring body and the first side surface of the first tooth, the first side surface defining an axially outermost side surface of the first tooth.

22. The method of claim 17, wherein the grip ring is formed from metal.

23. The method of claim 17, wherein the end surface of each of the first tooth and the second tooth defines a cylindrical shape.

* * * * *